Nov. 19, 1929.  J. T. RAMSDEN  1,736,363
MOLDING MACHINE CLAMP
Filed Nov. 5, 1927   2 Sheets-Sheet 1

WITNESS:
Robt P Kitchel.

INVENTOR
John T. Ramsden
BY
Augustus B. Stoughton.
ATTORNEY.

Patented Nov. 19, 1929

1,736,363

UNITED STATES PATENT OFFICE

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING-MACHINE CLAMP

Application filed November 5, 1927. Serial No. 231,307.

Molding machines are usually provided with an invertible or like table or frame or mold carrier of some kind to which a flask or core box is clamped and unclamped at different stages in the operation of making a mold.

The principal object of the present invention is to increase the speed of the clamping and unclamping operation, and to enable the single operator of a machine to effect high speed clamping and unclamping in addition to his usual duties.

To this and other ends hereinafter set forth the invention, generally stated, may be said to comprise a mold carrier, a pair of pivotal clamps, and mechanism constructed and arranged both to swing the clamps into and out of clamping position and to cause them to clamp.

The invention also comprises the improvements to be presently described and finally claimed.

Figure 1:
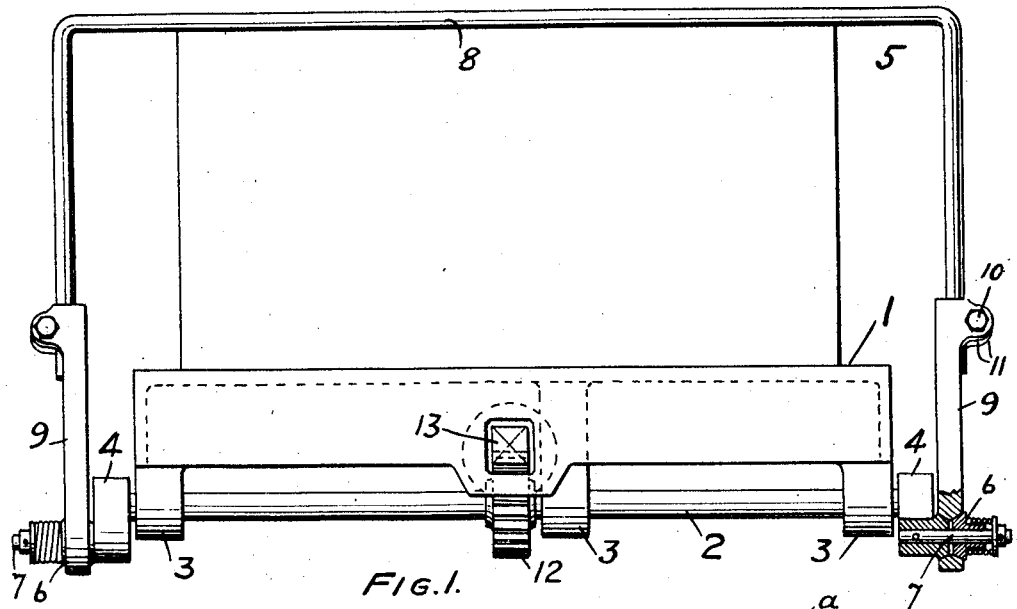

In the following description reference will be made to the accompanying drawings forming part hereof and which illustrate an embodiment of the invention and a modification thereof and in those drawings Figure 1 is an end elevational view partly in section.

Figure 2:
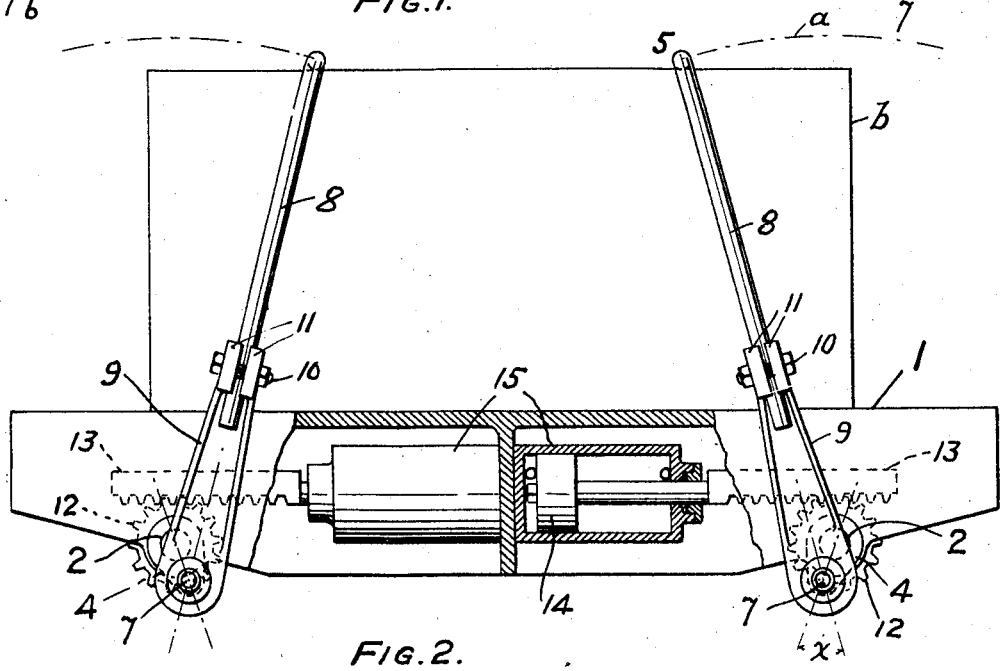
Figure 3:
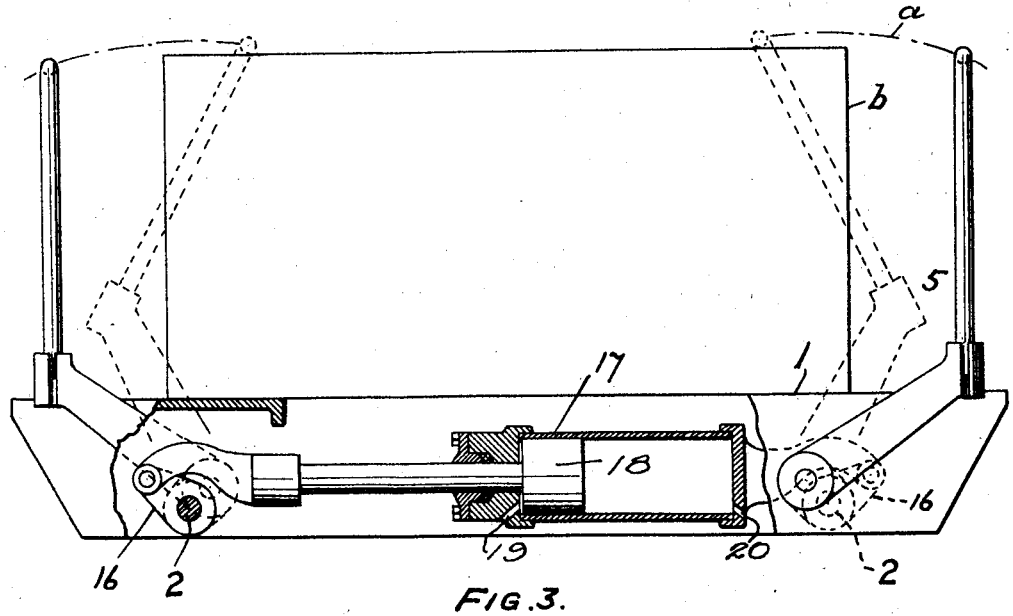
Figure 4:
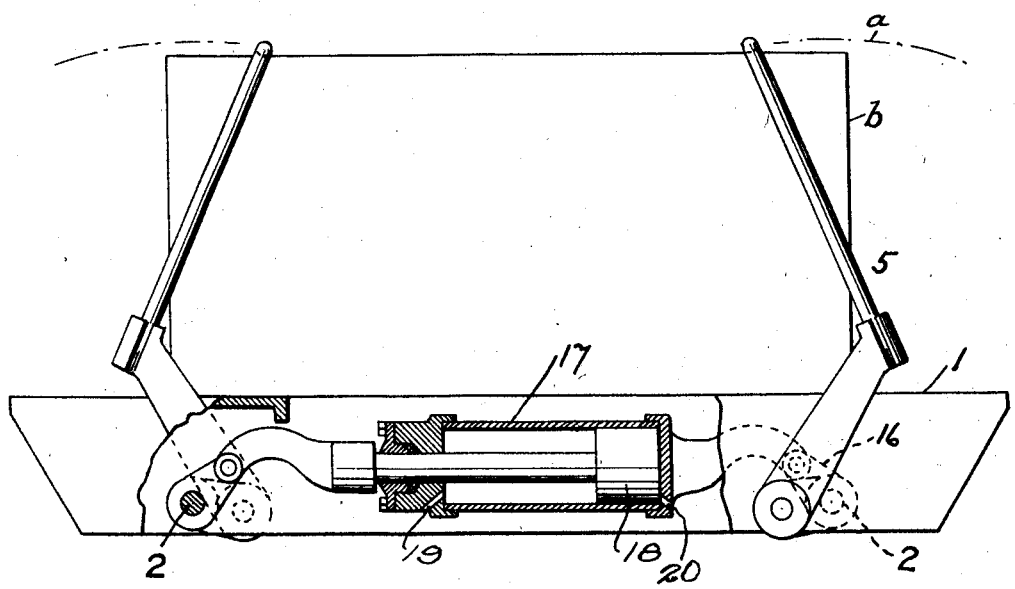

Fig. 2 is a side elevational with parts broken away showing the clamps in clamping position, and Figs. 3 and 4 are side views partly in section illustrating a modification and showing respectively the clamps in unclamping position and in clamping position.

In the drawings, more particularly Figs. 1 and 2, 1 is a mold carrier element such as a rollover frame. 2 indicates shafts mounted in the mold carrier for turning movement and as shown they range lengthwise of the mold carrier and are turnable in bearings 3. On the ends of each shaft are crank arms 4. The clamp, generally indicated at 5, is pivotally connected with the pins of the crank arms, as shown, through the intervention of two-cone spring clutch devices. As illustrated in the drawings the crank arms 4 are provided with one of the friction faces. The spring pressed elements 6 slidably mounted on the pins 7 provide another of the friction faces and the third friction face is provided on the clamp 5. The clamp 5 is shown to consist of a bail 8 adjustably connected with shanks 9 by means of bolts 10 passing through ears 11 which embrace the end portions of the bail. This adjustment is provided to fit the device for operation with flasks or boxes of different heights. Mounted on the shafts 2 are pinions 12, and these toothed pinions are actuated by racks 13 connected with the pistons 14 of double acting cylinders 15 connected with the mold carrier. There are provisions such as a fourway valve by means of which the pistons 14 can be moved in either direction in the cylinders. These provisions are not illustrated because they are too well understood to require illustration and because they in and of themselves form no part of the present invention.

The mode of operation may be described as follows:

When the pistons 14 move outward the effect on both clamps is the same so that a description of the operation of one of them will suffice. Referring to Fig. 2 and to the righthand clamp 5, the crank arm turns about the center of the shaft 2 clockwise and the operation of the two-cone clutch device is such that it exerts enough friction to prevent the clamp 5 from turning on the crank arm 4, consequently the clamp is moved about the center of the shaft 2 substantially in the path indicated by the dotted line $a$ into a position clear of the flask or like object $b$, thus detaching the latter from the carrier 1. Another way of saying this is to state that the angle $x$ between the center lines of the clamp and crank arm does not change. Movement of the pistons 14 in the opposite direction causes the crank arms to turn counter-clockwise and during this turning movement the clamps 5 retrace the dotted line path $a$, the angle $x$ remaining the same, until they come in contact with the object $b$ or some attachment thereof and then the crank arms continue to turn overcoming the friction of the two-cone clutch device, the angle $x$ becoming more acute, and drawing the clamps 5 downward, in the drawing, and thus clamping the object b to the carrier 1 by the pressure exerted by the actuating fluid of the pistons and cylinders.

The construction and mode of operation of the modification illustrated in Figs. 3 and 4 are as above described except that the shafts 2 are provided with additional crank arms 16, and between the crank arms 16 are interposed a double acting piston 18 and cylinder 17, and the piston 18 and cylinder 17 are supported wholly from the crank arms 16 and may therefore be said to be floating in the sense that they are free to move to permit of turning movement of the arms 16. The shafts 2, of this modification, carry crank arms and shanks having frictional clutch elements between them identical with those described above. Air is admitted to cylinder 17 through port 19 or port 20 to cause relative movement of the piston 18 and the cylinder 17 to actuate the shafts 2 through crank arms 16.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A molding machine clamp comprising a mold carrier, a pair of clamps, crank arms turnably mounted in the carrier, two-cone spring clutch devices interposed between the crank arms and the clamps, and power means for turning the crank arms.

2. A molding machine clamp comprising a mold carrier, crank arms turnably mounted on the carrier, a pair of clamps, friction clutch elements interposed between the clamps and crank arms, and means on the carrier for turning the crank arms.

3. A molding machine clamp comprising a mold carrier, clamps, bell crank levers pivotally mounted on the carrier, a piston and cylinder respectively connected to one of the arms of the bell cranks and floatably supported thereby, and friction pivots interposed between the other arms of the bell cranks and the clamps.

4. A molding machine clamp comprising a mold carrier, crank arms on the carrier, a pair of rigid clamps, means interposed between the crank arms and clamps and constructed and arranged to normally oppose relative turning movement of the arms and clamps and to permit relative turning movement thereof when the clamps encounter resistance, and mechanism for turning the arms.

5. In a molding machine clamp a mold carrier, shafts revolubly mounted in the carrier, means on the carrier for oscillating the shafts through a part of a revolution, clamps, and friction clutch means connected with the shafts and clamps and constructed and arranged to turn the clamps with the shafts about the center of the shafts and upon resistance to such movement of the clamps to draw the clamps toward the center of the shafts.

JOHN T. RAMSDEN.